US008580899B2

(12) United States Patent
Dowe et al.

(10) Patent No.: US 8,580,899 B2
(45) Date of Patent: *Nov. 12, 2013

(54) PROCESS FOR PRODUCING MOLDINGS WITH AN INCREASE IN THE MELT STIFFNESS

(75) Inventors: Andreas Dowe, Borken (DE); Rainer Goering, Borken (DE); Sonja Bollmann, Haltern am See (DE); Franz-Erich Baumann, Duelmen (DE)

(73) Assignee: Evonik Degussa GmbH, Essen (DE)

( * ) Notice: Subject to any disclaimer, the term of this patent is extended or adjusted under 35 U.S.C. 154(b) by 655 days.

This patent is subject to a terminal disclaimer.

(21) Appl. No.: 11/354,100

(22) Filed: Feb. 15, 2006

(65) Prior Publication Data

US 2006/0182916 A1 Aug. 17, 2006

(30) Foreign Application Priority Data

Feb. 15, 2005 (DE) .......................... 10 2005 007 035

(51) Int. Cl.
C08F 283/04 (2006.01)
C08L 77/00 (2006.01)

(52) U.S. Cl.
USPC .......................................... 525/433; 525/420

(58) Field of Classification Search
USPC ................................. 525/433, 420
See application file for complete search history.

(56) References Cited

U.S. PATENT DOCUMENTS

| | | | |
|---|---|---|---|
| 4,782,114 A * | 11/1988 | Perron et al. ...................... 525/66 |
| 4,800,218 A * | 1/1989 | Hathaway et al. ............. 525/433 |
| 5,405,936 A | 4/1995 | Mumcu et al. |
| 5,425,817 A | 6/1995 | Mugge et al. |
| 5,668,242 A | 9/1997 | Simon et al. |
| 5,932,687 A | 8/1999 | Baumann et al. |
| 6,060,550 A | 5/2000 | Simon et al. |
| 6,149,836 A | 11/2000 | Mumcu et al. |
| 6,232,388 B1 * | 5/2001 | Lan et al. ....................... 524/445 |
| 6,300,413 B1 | 10/2001 | Simon et al. |
| 6,316,537 B1 | 11/2001 | Baumann et al. |
| 6,335,101 B1 | 1/2002 | Haeger et al. |
| 6,500,554 B2 | 12/2002 | Gahlmann et al. |
| 6,579,581 B2 | 6/2003 | Bartz et al. |
| 6,589,606 B2 | 7/2003 | Waterkamp et al. |
| 6,656,997 B2 | 12/2003 | Baumann et al. |
| 6,677,015 B2 | 1/2004 | Himmelmann et al. |
| 6,766,091 B2 | 7/2004 | Beuth et al. |
| 6,784,227 B2 | 8/2004 | Simon et al. |
| 6,884,485 B2 | 4/2005 | Baumann et al. |
| 7,005,481 B1 * | 2/2006 | Lehmann et al. ............. 525/433 |
| 2003/0114636 A1 | 6/2003 | Schiffer et al. |
| 2003/0124281 A1 | 7/2003 | Ries et al. |
| 2004/0086735 A1 | 5/2004 | Monsheimer et al. |
| 2004/0097636 A1 | 5/2004 | Baumann et al. |
| 2004/0102539 A1 | 5/2004 | Monsheimer et al. |
| 2004/0106691 A1 | 6/2004 | Monsheimer et al. |
| 2004/0137228 A1 | 7/2004 | Monsheimer et al. |
| 2004/0138363 A1 | 7/2004 | Baumann et al. |
| 2004/0140668 A1 | 7/2004 | Monsheimer et al. |
| 2004/0180980 A1 | 9/2004 | Petter et al. |
| 2004/0204531 A1 | 10/2004 | Baumann et al. |
| 2004/0206443 A1 | 10/2004 | Monsheimer et al. |
| 2004/0232583 A1 | 11/2004 | Monsheimer et al. |
| 2005/0014842 A1 | 1/2005 | Baumann et al. |
| 2005/0027047 A1 | 2/2005 | Monsheimer et al. |
| 2005/0027050 A1 | 2/2005 | Monsheimer et al. |
| 2005/0038201 A1 * | 2/2005 | Wursche et al. ............. 525/340 |
| 2006/0223928 A1 | 10/2006 | Monsheimer et al. |
| 2006/0244169 A1 | 11/2006 | Monsheimer et al. |
| 2006/0281873 A1 | 12/2006 | Alting et al. |
| 2007/0055044 A1 | 3/2007 | Simon et al. |
| 2007/0166560 A1 | 7/2007 | Wursche et al. |
| 2007/0182070 A1 | 8/2007 | Monsheimer et al. |
| 2007/0238056 A1 | 10/2007 | Baumann et al. |
| 2007/0260014 A1 | 11/2007 | Simon et al. |
| 2008/0116616 A1 | 5/2008 | Monsheimer et al. |
| 2008/0119632 A1 | 5/2008 | Baumann et al. |
| 2008/0166496 A1 | 7/2008 | Monsheimer et al. |
| 2008/0213552 A1 | 9/2008 | Hager et al. |

(Continued)

FOREIGN PATENT DOCUMENTS

| | | |
|---|---|---|
| CA | 2 372 986 A1 | 11/2000 |
| DE | 103 37 707 A1 | 4/2005 |
| EP | 1 512 710 A2 | 3/2005 |
| WO | WO 00/66650 | 11/2000 |

OTHER PUBLICATIONS

U.S. Appl. No. 11/356,416, filed Feb. 17, 2006, Monsheimer, et al.
U.S. Appl. No. 11/241,667, filed Oct. 3, 2005, Monsheimer, et al.
U.S. Appl. No. 11/293,360, filed Dec. 5, 2005, Monsheimer, et al.
U.S. Appl. No. 11/335,587, filed Jan. 20, 2006, Monsheimer, et al.
U.S. Appl. No. 11/354,114, filed Feb. 15, 2006, Dowe, et al.

(Continued)

*Primary Examiner* — Michael L Leonard
(74) *Attorney, Agent, or Firm* — Oblon, Spivak, McClelland, Maier & Neustadt, L.L.P.

(57) ABSTRACT

A process for producing moldings with condensing-up of a polyamide molding composition by means of a compound having at least two carbonate units, wherein a) a polyamide molding composition is made available, b) a mixture of the polyamide molding composition and the compound having at least two carbonate units is prepared, c) the mixture is, if appropriate, stored and/or transported and d) the mixture is subsequently processed to produce the molding, with the condensing-up occurring only in this step, and the molding is a hollow body or hollow profile having an external diameter of at least 30 mm and a wall thickness of at least 1 mm, effects a significant increase in the melt stiffness combined with moderate processing presssures, which considerably simplifies the production of these moldings.

19 Claims, No Drawings

(56) References Cited

U.S. PATENT DOCUMENTS

| | | |
|---|---|---|
| 2008/0217821 A1 | 9/2008 | Goring et al. |
| 2008/0242782 A1 | 10/2008 | Hager et al. |
| 2008/0258346 A1 | 10/2008 | Simon et al. |
| 2008/0300353 A1 | 12/2008 | Monsheimer et al. |
| 2009/0088508 A1 | 4/2009 | Monsheimer et al. |
| 2012/0006465 A1 | 1/2012 | Dowe et al. |

OTHER PUBLICATIONS

U.S. Appl. No. 11/484,593, filed Jul. 12, 2006, Monsheimer, et al.
U.S. Appl. No. 11/480,459, filed Jul. 5, 2006, Dowe, et al.
U.S. Appl. No. 10/590,935, filed Aug. 28, 2006, Monsheimer, et al.
U.S. Appl. No. 10/592,952, filed Sep. 15, 2006, Monsheimer, et al.
U.S. Appl. No. 11/561,021, filed Nov. 17, 2006, Simon, et al.
U.S. Appl. No. 11/694,129, filed Mar. 30, 2007, Monsheimer, et al.
U.S. Appl. No. 60/831,222, filed Jul. 17, 2006, Hager, et al.
U.S. Appl. No. 12/407,065, Mar. 19, 2009, Monsheimer, et al.
U.S. Appl. No. 12/989,899, filed Oct. 27, 2010, Wurshche, et al.
U.S. Appl. No. 12/675,122, filed Feb. 25, 2010, Dowe, et al.
U.S. Appl. No. 12/676,752, filed Mar. 5, 2010, Dowe, et al.
U.S. Appl. No. 12/374,832, filed Jan. 23, 2009, Dowe, et al.
U.S. Appl. No. 13/063,134, filed Mar. 9, 2011, Dowe, et al.
U.S. Appl. No. 13/128,297, filed May 9, 2011, Dowe, et al.
U.S. Appl. No. 13/202,338, filed Aug. 19, 2011, Dowe, et al.
U.S. Appl. No. 13/729,280, filed Dec. 28, 2012, Pawlik, et al.
U.S. Appl. No. 13/463,061, filed May 3, 2012, Goering, et al.
U.S. Appl. No. 13/640,552, filed Oct. 11, 2012, Kuhmann, et al.
U.S. Appl. No. 13/639,765, filed Oct. 5, 2012, Kuhmann, et al.
U.S. Appl. No. 13/640,679, filed Oct. 11, 2012, Kuhmann, et al.
U.S. Appl. No. 13/640,586, filed Oct. 11, 2012, Kuhmann, et al.

\* cited by examiner

PROCESS FOR PRODUCING MOLDINGS WITH AN INCREASE IN THE MELT STIFFNESS

The present invention relates to a process for producing moldings with an increase in the melt stiffness in the processing of polyamides.

Polyamides are macromolecules which comprise the group —CO—NH— in the main chain. They are obtained either from two different bifunctional monomer building blocks which each have two identical reactive groups, e.g. —NH$_2$ or —COOH, or from uniform bifunctional building blocks which each bear or can form an amino group and a carboxyl group. Polyamides are, for example, prepared by polycondensation reactions of diamines with dicarboxylic acids or of aminocarboxylic acids or by ring-opening polymerization of lactams.

In general, polyamides are prepared by a two-stage process for applications which require a high melt stiffness. Here, a comparatively low-viscosity prepolymer is firstly prepared in a pressure reactor, as described, for example, in the Kunststoff-Handbuch, volume 3/4 Technische Thermoplaste, Polyamide; edited by Becker, Braun; Carl Hanser Verlag, 1998. The preproduct which is obtained in this way in the first reaction stage is subsequently brought to the required final molecular weight by reaction of the remaining end groups, for example by means of a solid-state after-condensation. The high molecular weight polyamide obtained is normally admixed with additives such as conductivity additives, stabilizers, plasticizers, nucleating agents, processing aids, colorants, etc.; the molding composition obtained in this way is then employed where an increased melt stiffness is necessary, inter alia in parison extrusion in blow molding or in thermoforming. However, a disadvantage is that the increase in the molecular weight to the required level requires a long reaction time or residence time, so that additional process costs are incurred.

WO 00/66650 describes the use of compounds having at least two carbonate units for condensing-up polyamides. Here, the properties can be set reliably and stably and it becomes possible to carry out multiple processing of the condensed-up material without gel formation or inhomogeneities occurring. An additive based on this principle for setting the molecular weight of polyamides is marketed by Brüggemann K G under the name Brüggolen M1251.

Primary applications are in the field of setting the viscosity of recycled PA6 or PA66 which is reused in molding compositions for extrusion. The additive Brüggolen M1251 is a masterbatch of a low-viscosity polycarbonate, for example Lexan 141, in an acid-terminated PA6. A reaction of the amino end groups present in the material to be condensed up with the polycarbonate is responsible for the increase in molecular weight.

The effectiveness of the method is demonstrated in WO 00/66650 for the example of the condensing-up of PA6 and PA66, with some of the corresponding polycondensates being used in pure form but some of them also containing additives such as glass fibers and montanate.

However, in the extrusion of geometries having large dimensions (pipes, profiles, further hollow bodies), various difficulties can occur after exit from the tool, due to, inter alia, the force of gravity. Sagging of the exiting molten tube is a visual indication of a low melt viscosity. Gravity leads to a shift in the wall thicknesses, so that an irregular distribution of the wall thickness of the hollow body can occur. In addition, the achievable dimensions and geometric shapes in profile extrusion are greatly restricted. The melt stiffness of conventional polyamides is not sufficient here to enable the preferred geometries to be able to be produced technically, economically, true-to-dimensions and reliably. In addition, a low melt stiffness leads to a fluctuating, unstable extrusion process which can show up in unstable entry of the extrudate into the calibration unit. This can lead to disturbance of production. On the other hand, if the molten tube after leaving the die has a high melt stiffness, it travels significantly more stably and is less sensitive to external extrusion influences. In the case of vertical extrusion (e.g. preform), the extruded molten tube must not stretch, which would reduce the wall thickness, and also not tear. The size of the geometries which can be produced by this extrusion technique are at present limited by the melt stiffness of the polyamide used. To be able to extrude large dimensions, a high melt stiffness is required here in particular.

However, extrusion of a polyamide molding composition having a high melt stiffness is difficult because of the high viscosity. As a result, an extraordinarily high differential pressure in the machine is necessary, and despite this it is still not possible to produce geometries having large dimensions at economically feasible extrusion rates, since the load on the motor is very high even at low throughputs.

It is an object of the present invention to avoid these disadvantages and to provide a process which allows the economical production of large geometries. This object is achieved by a process for producing moldings with condensing-up of a polyamide molding composition by means of a compound having at least two carbonate units, wherein a) a polyamide molding composition is made available,
b) a mixture of the polyamide molding composition and the compound having at least two carbonate units is prepared,
c) the mixture is, if appropriate, stored and/or transported and
d) the mixture is subsequently processed to produce the molding, with the condensing-up occurring only in this step, and the molding is a hollow body or hollow profile having an external diameter of at least 30 mm, preferably at least 60 mm and very particularly preferably at least 110 mm, and a wall thickness of at least 1 mm, preferably at least 3 mm, particularly preferably at least 6 mm and very particularly preferably at least 10 mm.

It has surprisingly been found that when this mode of addition during processing is employed, a significant increase in the melt stiffness occurs, combined with a low load on the motor. Thus, high throughputs can be achieved in processing despite a high melt viscosity, which results in an improvement in the economics of the production process.

A polyamide which is suitable for the purposes of the invention is based on lactams, aminocarboxylic acids, diamines and/or dicarboxylic acids. It can further comprise building blocks which effect branching and are derived, for example, from tricarboxylic acids, triamines or polyethylenimine. Suitable types are, in each case as homopolymer or copolymer, for example PA6, PA46, PA66, PA610, PA66/6, PA6/6T, PA66/6T and also, in particular, PA612, PA1010, PA1012, PA1212, PA613, PA1014, PA11, PA12 or a transparent polyamide. Possible transparent polyamides are, for example:

the polyamide derived from terephthalic acid and the isomer mixture of 2,2,4- and 2,4,4-trimethylhexamethylenediamine,
the polyamide derived from isophthalic acid and 1,6-hexamethylenediamine,
the copolyamide derived from a mixture of terephthalic acid/isophthalic acid and 1,6-hexamethylenediamine, the copolyamide derived from isophthalic acid, 3,3'-dimethyl-4,4'-diaminodicyclohexyl-methane and laurolactam or caprolactam, the (co)polyamide derived from 1,12-dodecanedioic acid, 3,3'-dimethyl-4,4'-diamino-dicyclohexylmethane and, if appropriate, laurolactam or caprolactam, the copolyamide derived from isophthalic acid, 4,4'-diaminodicyclohexylmethane and laurolactam or caprolactam, the polyamide derived from 1,12-dodecanedioic acid and 4,4'-diaminodicyclo-hexylmethane, the copolyamide derived from a terephthalic acid/isophthalic acid mixture, 3,3'-dimethyl-4,4'-diaminodicyclohexylmethane and laurolactam.

Further suitable polyamides are polyetheramides based on lactams, aminocarboxylic acids, diamines, dicarboxylic acids and polyether diamines and/or polyether diols.

The starting compounds preferably have molecular weights $M_n$ of greater than 5000, in particular greater than 8000. Here, use is made of polyamides whose end groups are at least partly present as amino groups. For example, at least 30%, at least 40%, at least 50%, at least 60%, at least 70%, at least 80% or at least 90% of the end groups are present as amino end groups. The preparation of polyamides having a relatively high amino end group content using diamines or polyamines as regulators is prior art. In the present case, an aliphatic, cycloaliphatic or araliphatic diamine having from 4 to 44 carbon atoms is preferably used as regulator in the preparation of the polyamide. Suitable diamines are, for example, hexamethylenediamine, decamethylenediamine, 2,2,4- or 2,4,4-trimethylhexamethylenediamine, dodecamethylenediamine, 1,4-diaminocyclohexane, 1,4- or 1,3-dimethylamino-cyclohexane, 4,4'-diaminodicyclohexyl-methane, 4,4'-diamino-3,3'dimethyldicyclohexyl-methane, 4,4'-diaminodicyclohexylpropane, isophoronediamine, meta-xylylidenediamine or para-xylylidenediamine.

In a further preferred embodiment, a polyamine is used as regulator and at the same time branching agent in the preparation of the polyamide. Examples of such polyamines are diethylenetriamine, 1,5-diamino-3-(β-aminoethyl)pentane, tris(2-aminoethyl)amine, N,N-bis(2-aminoethyl)-N',N'-bis[2-[bis(2-aminoethyl)amino]ethyl]-1,2-ethanediamine, dendrimers and polyethylenimines, in particular branched polyethylenimines, which are obtainable by polymerization of aziridines (Houben-Weyl, Methoden der Organischen Chemie, volume E20, pages 1482-1487, Georg Thieme Verlag Stuttgart, 1987) and generally have the following amino group distribution:

from 25 to 46% primary amino groups,
from 30 to 45% secondary amino groups and
from 16 to 40% tertiary amino groups.

In the process of the invention, at least one compound having at least two carbonate units is used in a ratio of from 0.005 to 10% by weight, based on the polyamide used. This ratio is preferably in the range from 0.01 to 5.0% by weight, particularly preferably in the range from 0.05 to 3% by weight. The term "carbonate" as used here refers to esters of carbonic acid, in particular with phenols or alcohols.

The compound having at least two carbonate units can be a low molecular weight compound or an oligomer or polymer. It can consist entirely of carbonate units or can have further units. These are preferably oligomeric or polymeric amide, ester, ether, ether-ester-amide or ether-amide units. Such compounds can be prepared by known oligomerization or polymerization processes or by polymer-analogous reactions.

In a preferred embodiment, the compound having at least two carbonate units is a polycarbonate, for example a polycarbonate based on bisphenol A, or a block copolymer comprising such a polycarbonate block.

The introduction of the compound having at least two carbonate units which is used as additive in the form of a masterbatch makes it possible to meter the additive more precisely, since relatively large amounts are used. In addition, it has been found that the use of a masterbatch results in an improved extrudate quality being achieved. The masterbatch preferably comprises the polyamide which is to be condensed up in the process of the invention or a polyamide compatible therewith as matrix material, but incompatible polyamides can also experience partial attachment to the polyamide to be condensed up under the reaction conditions, which effects compatibilization. The polyamide used as matrix material in the masterbatch preferably has a molecular weight $M_n$ of greater than 5000, in particular greater than 8000. Preference is here given to polyamides whose end groups are predominantly present as carboxylic acid groups. For example, at least 80%, at least 90% or at least 95% of the end groups are present as acid groups.

The concentration of the compound having at least two carbonate units in the masterbatch is preferably from 0.15 to 50% by weight, particularly preferably from 0.2 to 25% by weight and very particularly preferably from 0.3 to 15% by weight. Such a masterbatch is prepared in the customary manner known to those skilled in the art.

Suitable compounds having at least two carbonate units and suitable masterbatches are comprehensively described in WO 00/66650, which is hereby expressly incorporated by reference.

The invention can be applied to polyamides which, as a result of their method of preparation, contain at least 5 ppm of phosphorus in the form of an acidic compound. In this case, from 0.001 to 10% by weight, based on the polyamide, of a salt of a weak acid is added to the polyamide molding composition before compounding or during compounding. Suitable salts are disclosed in DE-A 103 37 707, which is hereby expressly incorporated by reference.

However, the invention can be applied equally well to polyamides which, as a result of their method of preparation, contain less than 5 ppm of phosphorus or no phosphorus at all in the form of an acidic compound. In this case, it is possible, but not absolutely necessary to add an appropriate salt of a weak acid.

The customary additives used in the production of polyamide molding compositions can be used in the process of the invention. Illustrative examples are colorants, flame inhibitors and retardants, stabilizers, fillers, surface slip improvers, mold release agents, impact modifiers, plasticizers, crystallization accelerators, antistatics, lubricants, processing aids and also further polymers which are customarily compounded with polyamides.

Examples of these additives are as follows:

Colorants: titanium dioxide, white lead, zinc white, liptones, antimony white, carbon black, iron oxide black, manganese black, cobalt black, antimony black, lead chromate, red lead, zinc yellow, zinc green, cadmium red, cobalt blue, Berlin blue, ultramarine, manganese violet, cadmium yellow, Schweinfurt green, molybdenum orange and red, chromium orange and red, iron oxide red, chromium oxide green, strontium yellow, molybdenum blue, chalk, ochre, umbra, green earth, calcined Terra di Siena, graphite or soluble organic dyes.

Flame inhibitors and flame retardants: antimony trioxide, hexabromocyclododecane, tetrachlorobisphenol or tetrabromobisphenol and halogenated phosphates, borates, chloroparaffins and red phosphorus, also stannates, melamine cyanurate and its condensation products such as melam, melem, melon, melamine compounds such as melamine pyrophosphate or polyphosphate, ammonium polyphosphate, aluminum hydroxide, calcium hydroxide and organophosphorus compounds which contain no halogens, for example resorcinol diphenyl phosphate or phosphonic esters.

Stabilizers: metal salts, in particular copper salts and molybdenum salts and also copper complexes, phosphites, sterically hindered phenols, secondary amines, UV absorbers and HALS stabilizers.

Fillers: glass fibers, glass spheres, ground glass fibers, kieselguhr, talc, kaolin, clays, $CaF_2$, aluminum oxides and carbon fibers.

Surface slip improvers and lubricants: $MoS_2$, paraffins, fatty alcohols and fatty acid amides.

Mold release agents and processing aids: waxes (montanates), montanic acid waxes, montanic ester waxes, polysiloxanes, polyvinyl alcohol, $SiO_2$, calcium silicates and perfluoropolyethers.

Plasticizers: BBSA, POBO.

Impact modifiers: polybutadiene, EPM, EPDM, HDPE, acrylate rubber.

Antistatics: carbon black, carbon fibers, graphite fibrils, polyhydric alcohols, fatty acid esters, amines, acid amides, quaternary ammonium salts.

Further polymers: ABS, polypropylene.

These additives can be used in the customary amounts known to those skilled in the art.

According to the invention, the compound having at least two carbonate units is added as such or as a masterbatch only after compounding, but at the latest during processing. The polyamide or polyamide molding composition to be condensed up is preferably mixed as pellets with the pelletized compound having at least two carbonate units or the corresponding masterbatch during processing. However, a pellet mixture of the previously compounded polyamide molding composition with the compound having at least two carbonate units or the masterbatch can also be produced, subsequently transported or stored and then processed. Correspondingly, powder mixtures can naturally also be employed. The critical aspect is that the mixture is not melted before processing. Thorough mixing of the melt during processing is advisable. The masterbatch can, however, equally well be metered as a melt stream with the aid of an auxiliary extruder into the melt of the polyamide molding composition to be processed and then mixed in thoroughly.

The moldings produced according to the invention are hollow bodies or hollow profiles, in particular ones having large diameters, for example gas pipes, offshore pipelines, supply lines, cable conduits, filling station supply lines, ventilation lines, air intake pipes, tank filling ports, storage vessels and fuel tanks. Such moldings can be produced, for example, by extrusion, coextrusion or blow molding including suction blow molding, 3-D blow molding, parison insertion and parison manipulation processes. These processes are prior art.

The wall of these hollow bodies or hollow profiles can consist of a single layer and in this case consist entirely of the molding composition used according to the claims or can consist of a plurality of layers, with the molding composition used according to the invention being able to form the outer layer, the inner layer and/or the middle layer. The other layer or layers comprise molding compositions based on other polymers, for example polyethylene, polypropylene, fluoropolymers, or metal, for example steel. For example, offshore pipelines usually have a multilayer structure; they generally comprise a steel structure which is protected against media by polymer layers both on the inside and on the outside of the pipe.

The invention is illustrated by way of example below. The following materials were used in the experiments:

Amine-regulated PA12 having 50 meq/kg of $NH_2$ groups and 9 meq/kg of COOH groups, $\eta_{rel}$ about 2.15. Contains 54.5 ppm of phosphorus as a result of the method of preparation.

Acid-regulated PA12 having 8 meq/kg of $NH_2$ groups and 50 meq/kg of COOH groups, $\eta_{rel}$ about 2.15. Contains 54.5 ppm of phosphorus as a result of the method of preparation.

Brüggolen® M1251, a mixture of low-viscosity polycarbonate and an acid-terminated PA6.

Ceasit® PC (Calcium stearate).

The compositions indicated in table 1 were produced on a Werner & Pfleiderer ZSK 30 twin-screw extruder.

COMPARATIVE EXAMPLES A AND B AND EXAMPLE 1

The starting materials indicated in table 2 were processed starting from pellets or a pellet mixture on a 50 mm Reifenhäuser single-screw extruder having a three-zone screw and L=25 D and extruded as pipes having a wall thickness of 2.9 mm and an external diameter of 32 mm. It can be seen from a comparison of comparative example B with example 1 that a significantly lower motor load was necessary according to the invention to produce a pipe from a very high molecular weight polyamide.

When the composition B is used directly, $\eta_{rel}$ (as a measure of the molecular weight) decreases from an initial 2.55 to 2.30 (comparative example B) due to chain degradation under shear. No such chain degradation is found in the process according to the invention (example 1).

TABLE 1

Production of the compositions

|  | Composition A | Composition B | Batch 1 | Batch 2 |
|---|---|---|---|---|
| Amine-regulated PA12 [% by weight] | 60 | 99.3 | 99.9 | 0 |
| Acid-regulated PA12 [% by weight] | 40 | 0 | 0 | 98.4 |
| Brüggolen M1251 [% by weight] | 0 | 0.6 | 0 | 1.5 |
| Ceasit PC [% by weight] | 0 | 0.1 | 0.1 | 0.1 |
| Throughput [kg/h] | 10 | 10 | 10 | 10 |
| Shear rate [1/min] | 250 | 250 | 250 | 250 |
| Melt temperature [° C.] | 251 | 259 | 249 | 251 |
| Melt pressure [bar] | 33 | 62 | 35 | 34 |
| Motor power [%] | 73 | 96 | 78 | 72 |
| $\eta_{rel}$ in accordance with DIN EN ISO 307 | 2.11 | 2.55 | 2.10 | 2.12 |

TABLE 2

Processing to produce pipes

|  | Composition A | Composition B | Example 1 |
|---|---|---|---|
| Composition A [% by weight] | 100 | 0 | 0 |
| Composition B [% by weight] | 0 | 100 | 0 |
| Batch 1 [% by weight] | 0 | 0 | 60 |
| Batch 2 [% by weight] | 0 | 0 | 40 |
| Shear rate [1/min] | 37 | 37 | 37 |
| Takeoff speed [m/min] | 2.3 | 2.3 | 2.3 |

TABLE 2-continued

Processing to produce pipes

|  | Composition A | Composition B | Example 1 |
|---|---|---|---|
| Melt temperature [° C.] | 242 | 255 | 247 |
| Melt pressure [bar] | 58 | 97 | 119 |
| Motor power [%] | 66 | 94 | 70 |
| $\eta_{rel}$ in accordance with DIN EN ISO 307 | 2.08 | 2.30 | 2.51 |

The invention claimed is:

1. A process for producing a molding, comprising:
   (a) preparing a mixture of a polyamide molding composition and a compound having at least two carbonate units without permitting condensing-up by melt mixing of the polyamide molding composition by the compound having at least two carbonate units and without permitting the polyamide molding composition or the compound having at least two carbonate units to melt, during preparation of the mixture;
   (b) optionally storing the mixture; and
   (c) feeding the mixture into an extruder configured to form the molding and operating the extruder under conditions that cause condensing-up of the polyamide molding composition by the compound having at least two carbonate units to produce the molding;
   wherein the molding is a hollow body or hollow profile having an external diameter of at least 30 mm and a wall thickness of at least 1 mm.

2. The process as claimed in claim 1, wherein the polyamide has been prepared using a diamine or polyamine as regulator.

3. The process as claimed in claim 1, wherein the compound having at least two carbonate units is used as a masterbatch.

4. A molding produced by the process as claimed in claim 1.

5. The molding as claimed in claim 4, which is a gas pipe, an offshore pipeline, a supply line, a cable conduit, a filling station supply line, a ventilation line, an air intake pipe, a tank filling port, a storage vessel or a fuel tank.

6. The molding as claimed in claim 4, in which the wall has a multilayer structure.

7. The process as claimed in claim 1, wherein the hollow body or hollow profile has an external diameter of at least 60 mm.

8. The process as claimed in claim 1, wherein the hollow body or hollow profile has an external diameter of at least 110 mm.

9. The process as claimed in claim 1, wherein the hollow body or hollow profile has wall thickness of at least 6 mm.

10. The process as claimed in claim 1, wherein the hollow body or hollow profile has wall thickness of at least 6 mm.

11. The process as claimed in claim 1, wherein said polyamide molding composition has a Mn of greater than 5,000.

12. The process as claimed in claim 1, wherein said polyamide molding composition has a Mn of greater than 8,000.

13. The process as claimed in claim 1, wherein said polyamide of said polyamide molding composition has at least 30% end groups present as amino end groups.

14. The process as claimed in claim 1, wherein said polyamide of said polyamide molding composition has at least 50% end groups present as amino end groups.

15. The process as claimed in claim 1, wherein said polyamide of said polyamide molding composition has at least 70% end groups present as amino end groups.

16. The process as claimed in claim 1, wherein said at least one compound having at least two carbonate units is used in a ratio of from 0.005 to 10% by weight based on said polyamide molding composition.

17. The process as claimed in claim 1, wherein said at least one compound having at least two carbonate units is used in a ratio of from 0.01 to 5.0% by weight based on said polyamide molding composition.

18. The process as claimed in claim 1, wherein said at least one compound having at least two carbonate units is used in a ratio of from 0.05 to 3% by weight based on said polyamide molding composition.

19. The process as claimed in claim 1, wherein said polyamide molding composition is in the form of pellets.

* * * * *